Oct. 27, 1964 L. R. HARPER 3,154,676

CHANGE ADDER

Filed April 25, 1961 6 Sheets-Sheet 1

INVENTOR.
LEONARD ROY HARPER
BY Carl W. Laumann Jr.
ATTORNEY

Oct. 27, 1964 L. R. HARPER 3,154,676

CHANGE ADDER

Filed April 25, 1961 6 Sheets-Sheet 2

BINARY SECTION ADDER

Oct. 27, 1964 L. R. HARPER 3,154,676

CHANGE ADDER

Filed April 25, 1961 6 Sheets-Sheet 3

Oct. 27, 1964 L. R. HARPER 3,154,676

CHANGE ADDER

Filed April 25, 1961 6 Sheets-Sheet 4

SUM AND RECOMPLEMENT

FORM CONVERTER

CHANGE ADDER

T2 $\overline{F8}$
T4 F2F4, F8
T6 $\overline{F4}$, $\overline{F8}$
T8 F2, F4, F8

T2 F2
T4 $\overline{F8}$
T6 $\overline{F2}$, F4
T8 $\overline{F2}$F4, F8

T2 F2F4, F8
T4 $\overline{F2}$F4, F8
T6 F2$\overline{F4}$, F8
T8 $\overline{F2}$ $\overline{F4}$ T2 $\overline{F2}$, F4
T4 $\overline{F4}$, $\overline{F8}$
T6 F4
T8 $\overline{F4}$, F2

T2 F8
T4 F2F4, F8
T6 F4, F8
T8 F2, F4, F8
T10 F8C2+, F0C2−

United States Patent Office 3,154,676
Patented Oct. 27, 1964

3,154,676
CHANGE ADDER

Leonard Roy Harper, San Jose, Calif., assignor to International Business Machines Corporation, New York, N.Y., a corporation of New York Filed Apr. 25, 1961, Ser. No. 105,411
10 Claims. (Cl. 235—170)

This invention relates generally to electronic computing circuits and in particular those circuits for adding decimal digits recorded in the binary coded decimal form.

Many electronic systems exist for combining two numbers in a manner to develop the sum. While these systems vary according to the manner of representing the numbers by electrical signals, these systems may be divided into two categories, serial and parallel adders. Parallel adders provide a very rapid derivation of the sum but require more hardware than serial adders which are less expensive but are correspondingly slower in developing the sum.

The well known matrix adder is probably the fastest method of combining two numbers to provide the sum. In such an adder all signals representing the two numbers are applied simultaneously to the inputs and an elaborate decoding circuit is used to derive the sum. In a matrix adder there is no necessity for additional cycles to develop a carry nor is there any carry ripple such as exists in some parallel adders. Thus, the sum is produced after a very short period of time which depends on the delay of the logical elements. Where the decoding circuit uses diodes as logical elements, the response time of the adder will be very short. Matrix adders have not come into broad use because of the large number of decoding elements required to accommodate all possible combinations. Where large numbers are to be combined a matrix becomes unwieldy, expensive, and unreliable. Thus, while the matrix adder is attractive from the standpoint of speed, the hardware requirements tend to make it impractical.

When handling a number represented in the 8, 4, 2, 1 or binary coded decimal code the matrix adder is an impractical approach because the four or five bits of information required to represent each decimal digit results in an excessively large number of circuit elements where a reasonable number of digits is combined. While decimal representation is attractive from many standpoints, it is somewhat unwieldy when calculations are to be accomplished. In order to overcome these disadvantages a conversion to the straight binary representation is often made prior to the arithmetic operation. This, of course, requires additional components which add to cost and decrease the circuit reliability. Furthermore, such a conversion requires additional time and results in a slower combination of the two numbers.

Another method of combining two numbers represented in binary coded decimal form is to make a serial comparison or addition of corresponding bits of each digit. In the typical case this would require five or six cycles of operation to provide the sum of each digit. Where extremely low cost is a requirement and speed is not necessary, this method is satisfactory for deriving the sum. However, in most cases it is much too slow to satisfy the minimum speed requirements and has not found wide use for this reason.

Various other types of adders exist for the 8, 4, 2, 1 code. For example, the parallel by bit serial by digit adder described at page 211 of Arithmetic Operations in Digital Computers, by R. K. Richards, D. Van Nostrand Company, Inc., 1955. This adder and most others like it are limited by the speed of carry propagation from one binary order to the next. The case where a carry is propagated from the lowest to the highest order is the limiting case since this must be provided for. It is possible to create a wide variety of this type adder but the carry propagation time is always limiting. Despite these disadvantages this is probably the most widely used decimal adder.

The adder of this invention combines the high speed of the matrix adder with the low cost of the serial type device to provide a fast, low cost adder for the binary coded decimal representation which is not limited by the carry propagation time. According to my invention two numbers recorded in the binary coded decimal form are combined with two adders. The lowest binary order of each digit is combined in a binary adder to produce a signal for the lowest order. The higher orders of the binary coded decimal number are combined in a modified matrix adder in which a correction is made for a binary carry resulting from the combination of the lowest order. The output of the binary adder and the matrix adder is not the actual sum of the two numbers but rather a signal indicating how one of the numbers should be changed to represent the sum. This allows the logic of the matrix adder to be considerably simplified and therefore reduces the number of required components. The Change signals provided by the binary and matrix adder are then combined with the appropriate number in a manner to provide the sum. Thus, my invention provides the high speed of the matrix adder while retaining the simplicity and low cost of the serial device. The resulting high speed adder is relatively inexpensive and allows binary coded decimal numbers to be directly combined without first converting to straight binary form.

It is therefore an object of my invention to provide a low cost high speed adder for binary coded decimal numbers.

It is another object of my invention to provide a simplified matrix adder for combining binary coded decimal numbers.

Another object of my invention is to provide a binary adder in combination with a matrix adder to combine binary coded decimal numbers.

It is still another object of my invention to provide a simplified matrix adder.

Still another object of my invention is to provide an adder which provides an output representative of the changes which must be made in one number to represent the sum of two numbers.

A further object of my invention is to provide a modified matrix adder which is simplified by making preliminary additions and conversions to the input signals.

The foregoing and other objects, features, and advantages of the invention will be apparent from the following more particular description of a preferred embodiment of the invention as illustrated in the accompanying drawings.

FIG. 1 of the drawings is a schematic representation of a simplified computer using my Change adder.

Figure 7A:
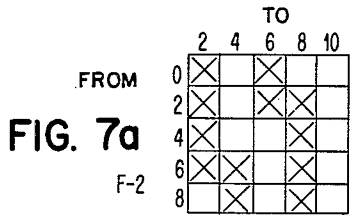

FIGS. 7*a* thorugh 7*e* are the Truth Tables for the Change adder of my invention.

Figure 1:
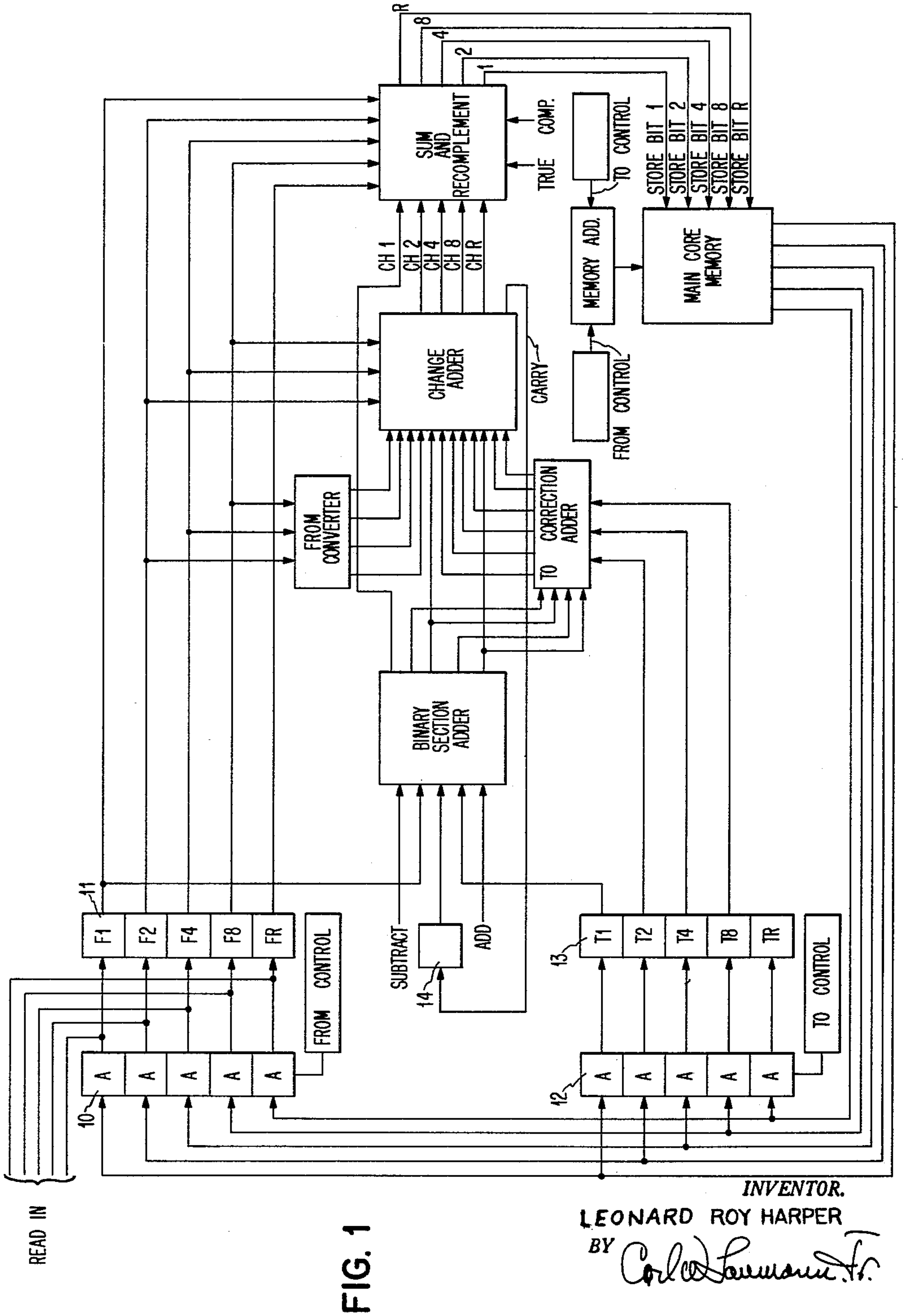

The computer shown in FIG. 1 operates to add or subtract two groups of numbers known as words. The words are made up of a plurality of binary coded decimal digits. One word will be referred to as the TO word and the other as the FROM word for the purpose of explanation.

The control circuits for moving digits to the TO and FROM words in and out of core storage are well known in the art. These elements are described only in general terms since they do not constitute part of my invention. It will be understood that such circuits, although they are not shown in detail, would be required in a computer using my invention.

Assuming that the TO and FROM words have been placed in the main core storage, the control circuitry associated with the computer reads a first digit of the FROM word out of the main core storage and places it in a first or FROM register 11. The FROM register 11 and its counterpart a second or TO register 13, are made up of triggers which serve to store each of the bits which make up one digit. It will be observed that sense amplifiers 10 and 12, associated with the FROM and TO registers 11 and 13 are controlled by the FROM and TO controls respectively. Thus, depending on the identity of the word, the digit read out can be placed in either the FROM register or the TO register as determined by the FROM and TO control circuits. In the computer of FIG. 1 the operating cycle is divided into two parts; the FROM time, during which the selected digit in the FROM word is read from storage and regenerated, and TO time, during which the selected digit in the TO word is read from storage and the sum of the TO and FROM digits is placed in storage in the TO digit position. Most core storage devices are destructive in their readout, that is to say, a bit which is read out of storage is destroyed in the readout process. It is necessary in many applications to regenerate the data in core storage to prevent its loss. To allow the digit to be regenerated in storage, the FROM and TO times of i.e., computer cycle are each subdivided into two portions, the read and write times. Read time occurs first during each FROM and TO time and allows a digit to be read from core storage and placed in the appropriate register. The latter portion of each FROM and TO time is the write time. This latter portion of the FROM time allows the information bits in the FROM register to be regenerated at the same address in the main core storage. Write time of the TO cycle does not regenerate the digit read out from the TO word but rather provides for storage of the sum of the TO and FROM digits at the vacated digit position of the addressed TO word. This will be described in greater detail but it is important to remember that the read out digit in the TO word is not regenerated in memory but rather is replaced by a value representing the sum or difference of the TO and FROM digits.

At the end of FROM time the FROM register 11 contains the first digit of the FROM word and this digit has been regenerated in the main core storage at its original address. When the computer goes into the TO time the first digit of the TO word is read out of the core storage and placed in the TO register 13. The operation of the TO register and its associated sense amplifiers is identical to that of the FROM register previously described. At the end of the write time during the TO time of the computer cycle certain static values exist on the lines emanating from the triggers in the FROM and TO registers. It will be observed that the bit 1 position in the TO and FROM registers is connected to the Binary section adder of FIG. 2. Also connected as an input to this adder is the output of a third register in the form of Carry trigger 14. The Binary section adder operates to combine the bit 1 positions of the digits being added together with decimal carries from previous operations and its first output is a signal which indicates how the bit 1 position of the FROM digit should be changed to represent the sum of the 1 bits in the FROM and TO registers and the carry, if any, of trigger 14. The output of the Binary section adder is a Change 1 signal and not specifically a sum. For example, if the TO and FROM registers each contain a bit in the 1 position and there is no carry, the Binary section adder produces a Change 1 signal. This means that the status of the bit 1 position in the FROM digit has to be changed to indicate the sum of the carry, the TO the FROM digits. It will be remembered at this point that the sum of a binary 1 and a binary 1 is 0 with a binary carry. The Change 1 signal operates to change the 1 bit to a $\bar{1}$ which is the correct sum. In another case, the FROM digit might contain a bit in the 1 position and the TO digit contain no bit in the 1 position again with no carry. There is then no Change signal output from the Binary section adder since the status of the bit 1 position in the FROM register correctly indicates the sum of the 1 bit positions.

The other outputs of the Binary section adder represent a binary carry to the higher bit orders. Since the binary coded decimal number is represented by bits in binary 1, binary 2, binary 4, and binary 8 positions it is necessary to accommodate a carry from the bit 1 position to the higher bit orders within a digit position. The carry and not carry indications are conveyed to the TO Correction adder. Other inputs to the TO Correction adder are the 2, 4, and 8 bit positions of the TO register.

Figure 3:
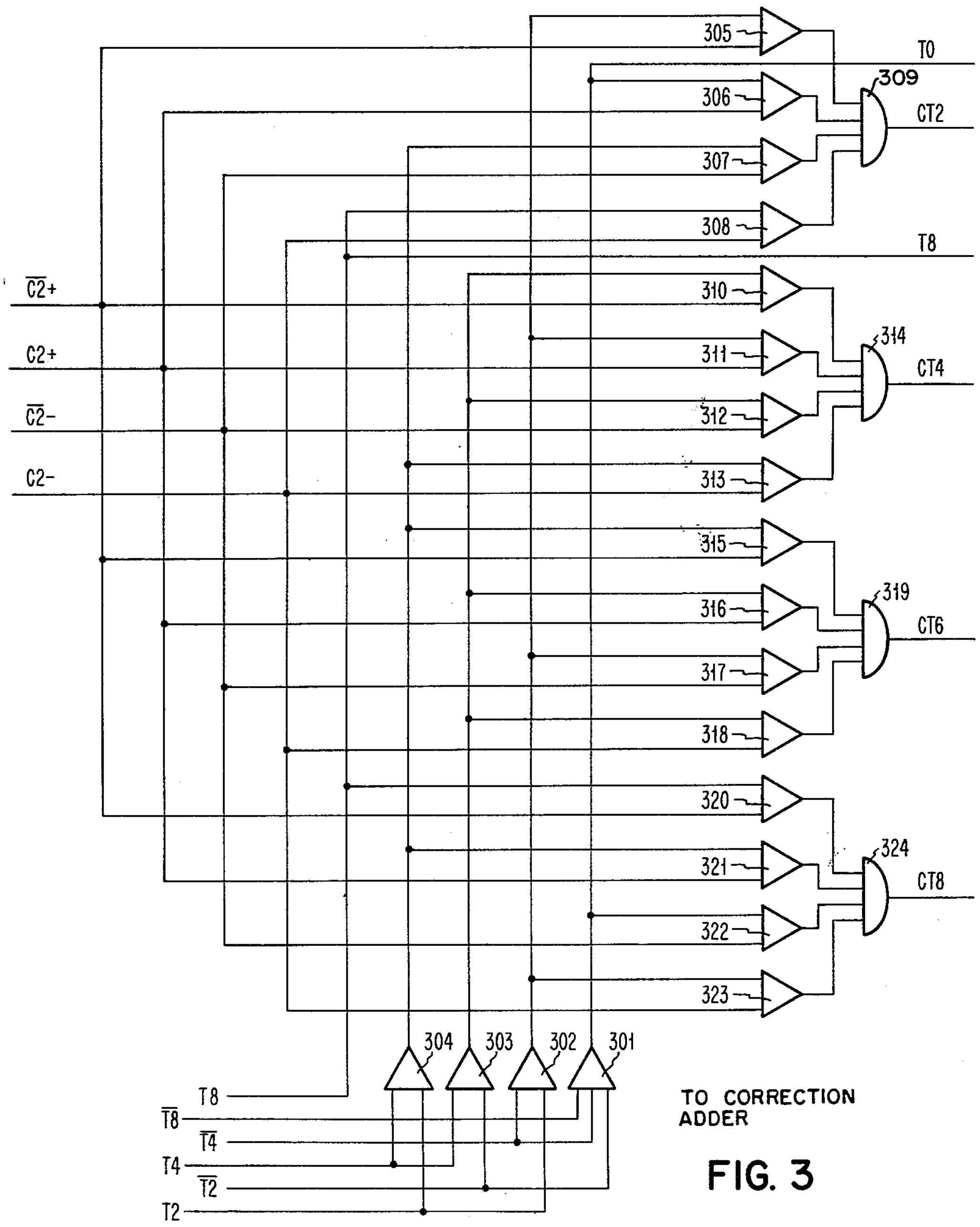
FIG. 3 is a schematic logical drawing of the TO Correction adder.

The carries and the appropriate bit positions of the TO register are combined in the TO Correction adder of FIG. 3 to produce corrected TO digits. The corrected TO digits along with certain absolute TO digit values are connected to the input of the matrix or Change adder of FIG. 5. Other inputs to the Change adder come from the FROM converter of FIG. 4.

An important aspect of the invention is that certain preliminary logical operations on the values to be combined permits a great simplification in the matrix adder. The FROM converter performs some of these conversions and has as its output, information about the FROM 2, 4, and 8 bit positions.

The Change adder takes information from the Binary section adder, the FROM converter, the TO Correction adder, the FROM register and operates in the manner of a matrix adder to combine these values and produce a Change 2, a Change 4, a Change 8 and a Change R signals together with a carry signal representing a carry to the next decimal digit. As was the case with the Binary section adder, the Change adder does not actually produce a sum, but only Change signals which must then be combined with the FROM digit value to produce the sum.

Figure 6:
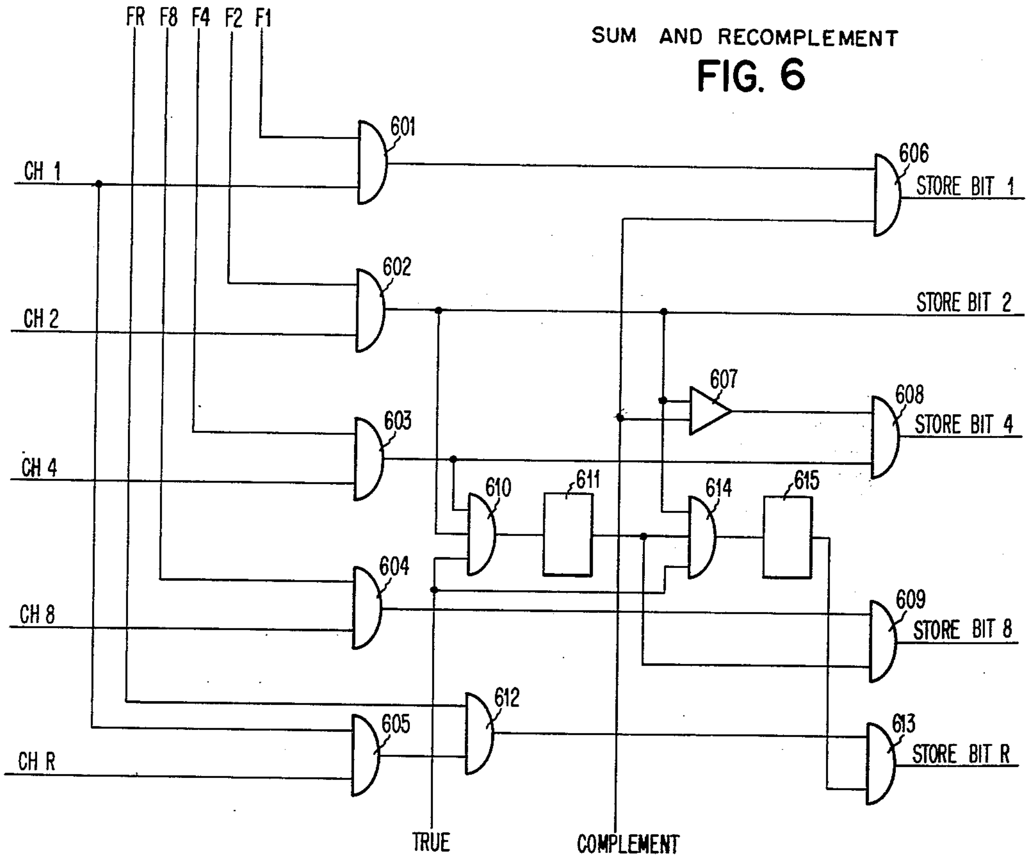
FIG. 6 is a schematic logical drawing of the sum and recomplement circuits.

This combination of the FROM digit value and the Change signals is accomplished in the sum and recomplement circuit of FIG. 6. The output of the sum and recomplement circuit is the sum of the digits contained in the FROM and TO registers. As shown in FIG. 1 this sum is then stored in the main core storage.

The combination of the Binary section adder, the FROM converter, the TO Correction adder, the Change adder and the sum and recomplement circuit is exceedingly fast since simple diode logic may be used. During the read portion of the TO time the values on the output lines of the sum and recomplement circuit are established and when the computer goes into the write portion of TO time, the sum is placed in storage to replace the digit of the TO word at that location.

Reviewing briefly the operation of the computer, the values in a digit position of the FROM word is read from the addressed main core storage and placed in the FROM register 11. This same information is rewritten or regenerated at the same digit location through the sum and recomplement circuits. The values in the corresponding digit position of the TO word is then read from main core storage, placed in the TO register 13 and then combined with the values of the FROM word digit. The value of the sum of the TO and FROM digit values is placed in the main core storage at the former location of the TO digit. Thus, at the end of an add operation, the value of the FROM word digit is regenerated in storage at the same location but the value of the TO word digit has been replaced by the sum.

In the following more detailed description of the invention, frequent reference is made to AND gates, OR circuits, Exclusive OR circuits and Inverters. The AND gate provides an output signal when all of the inputs are energized or high. Circuits of this nature are well known in the art. The OR circuit provides an output signal when any of the inputs are high. The Exclusive OR provides an output when one, but not both, of the inputs are high. A circuit of this type is described in U.S. Patent 2,903,602 to H. Fleisher. The Inverter provides a high output when the input is low and a low output when the input is high.

Outputs from various of the units are represented in simplified form. For example, $\overline{F2}$, F4 is read as "no bit in the two bit position of the FROM register or a bit in the four bit position." Simplified, this is "not F2 or F4." $\overline{C2-}$ would be read as "not C2 minus."

While not specifically shown in FIG. 1, but indicated in the more detailed FIGS. 11 and 13, each trigger in the FROM and TO registers, as well as the Carry trigger 14, has two output lines. If the FROM register contains a bit in the 1 bit position the F1 line will be high indicating the presence of a bit in the 1 bit trigger. At the same time the $\overline{F1}$ line will be low. If there is no bit in the 1 bit position the $\overline{F1}$ line would be high and the F1 line low.

To further simplify the description all AND gates are represented by a triangle and OR circuits by a segment of a circle.

"BINARY SECTION ADDER"

Figure 2:
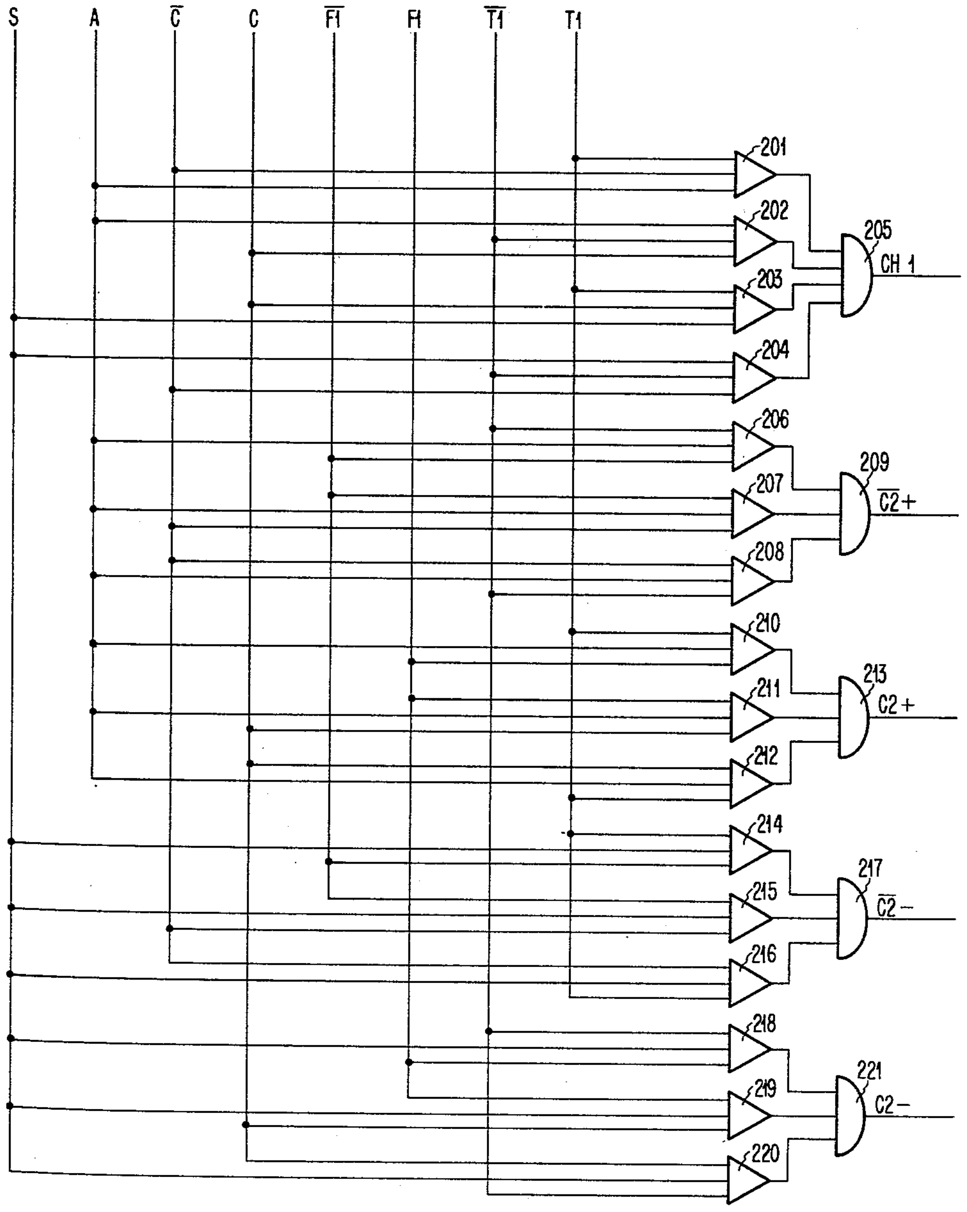
FIG. 2 is a schematic logical drawing of the Binary section adder.

The Binary section adder shown in FIG. 2 combines the 1 bits of the TO and FROM digits stored in the registers and derives the Change 1 signal and binary carry to the higher order, if any. Since a previous addition operation may have resulted in a decimal carry from the next lowest digits, it is necessary to provide an input to the Binary section adder from Carry trigger 14. Two outputs T1 and $\overline{T1}$ from the bit 1 trigger in the TO register are connected to the Binary section adder. Similarly, two outputs, F1 and $\overline{F1}$, from the bit 1 trigger in the FROM register are connected to the Binary section adder. When the T1 line is high, it indicates that a bit exists in the bit 1 position of the digit stored in the FROM register. When the $\overline{T1}$ line is high, it indicates that no bit exists in the bit 1 position of the digit contained in the TO register. The F1 and $\overline{F1}$ lines provide a corresponding indication for the bit 1 position in the FROM register. The third data input to the Binary section adder comes from the Carry trigger 14. When the C line is high it indicates that a carry exists from a previous arithmetic operation. This has the same weight as a bit in the F1 or a T1 position. When the $\overline{C}$ line is high it indicates that no carry exists from the previous arithmetic operation. A control line A is provided for the add operation and a control line S is provided for the subtract operation. One or the other of these control lines is high according to the operation being performed. The circuitry for energizing the control lines is not shown since it does not form part of the invention.

The following chart illustrates the possible combinations of T1, F1 and C and the resultant change and carry signal which are produced by their combinations.

*Addition*

| | T1 | F1 | C | Change F1 | Carry (C2+) |
|---|---|---|---|---|---|
| 1 | Yes | No | No | Yes | No. |
| 2 | No | No | Yes | Yes | No. |
| 3 | No | Yes | No | No | No. |
| 4 | Yes | Yes | Yes | No | Yes. |
| 5 | Yes | Yes | No | Yes | Yes. |
| 6 | No | Yes | Yes | Yes | Yes. |
| 7 | Yes | No | Yes | No | Yes. |
| 8 | No | No | No | No | No. |

The first line of the chart shows the result of combining a T1 with $\overline{F1}$ and $\overline{C}$. This combination is produced in AND gate 201. The inputs to AND gate 201 are T1, $\overline{C}$ and Add. The output of AND gate 201 is connected to OR circuit 205 and produces a Change 1 signal when T1, $\overline{C}$ and Add lines are high. The second line illustrates the result of combining $\overline{T1}$, $\overline{F1}$ and C. This produces a Change 1 signal through OR circuit 205 from AND gate 202 which has as its inputs C, $\overline{T1}$ and Add. AND gates 203 and 204 are directed to the subtract operation and will be discussed later. The conditions as set forth in lines 5 and 6 of the chart are also determined by AND gates 201 and 202. Since AND gate 201 produces a Change 1 signal whenever T1 and $\overline{C}$ exist this AND gate is conditioned for the inputs of line 1 and the inputs of line 5 as shown in the chart. AND gate 202 is conditioned by the inputs of line 2 of the chart and also by the inputs of line 6. Thus, the four conditions for which a Change 1 signal is produced are satisfied by the logical inputs to AND gate 201 and AND gate 202.

The existence of a binary carry, C2+, or the absence of a binary bit carry, C2−, to the next highest binary order must also be determined. AND gate 206, having as its inputs, Add, $\overline{T1}$, and $\overline{F1}$, corresponds to line 2 and line 8 of the chart. A $\overline{C2+}$ signal is produced when there is no 1 bit in the FROM digit and no 1 bit in the TO digit. The output of AND gate 206 is connected through OR circuit 209 and produces $\overline{C2+}$ indicating the absence of a binary carry to the next higher binary bit order. AND gate 207 corresponds to line 1 of the chart and has as its inputs Add, $\overline{C}$, and $\overline{F1}$. The output of AND gate 207 is connected through OR circuit 209 and indicates $\overline{C2+}$.

The third possible condition where there is no carry is that where $\overline{C}$, $\overline{T1}$ and Add are high. This condition is provided for by AND gate 208 and corresponds to line 3 of the chart. The output of AND gate 208 is connected through OR circuit 209 to indicate $\overline{C2+}$. It is also necessary to derive C2+, the existence of a carry to the next higher binary bit order. AND gates 210, 211, and 212 are provided for this purpose. AND gate 210 has as its input T1, F1 and Add. These conditions correspond to line 4 and line 5 of the chart. A carry to the next higher binary bit order is indicated by the output of AND gate 210 passing through OR circuit 213.

AND gate 211 has as its inputs F1, C and Add. When all three of these lines are high an output is produced through OR 213 to indicate C2+. AND gate 211 corresponds to line 6 of the chart. The carry produced under the conditions of line 7 of the draft corresponds to the AND gate 212. This AND gate has as its inputs Add, C and T1. Like AND gates 210 and 211, AND gate 212 has its output connected through OR circuit 213 to indicate the existence of C2+, a binary carry to the next higher binary bit order.

The foregoing discussion describes the conditions and the circuitry required in the Binary section adder for the purpose of adding the bit 1 positions of the TO and FROM digits.

Since it is also a requirement that the device be capable of subtraction, circuitry is provided for this purpose in the Binary section adder. The following chart is illustrative of the rules for binary subtraction.

*Subtraction*

| | Minuend T1 | Subtrahend F1 | Borrow C | Change F1 | Store F1 | Carry (C2−) |
|---|---|---|---|---|---|---|
| 1 | Yes | No | No | No | Yes | No. |
| 2 | No | No | Yes | No | Yes | Yes. |
| 3 | No | Yes | No | Yes | Yes | Yes. |
| 4 | Yes | Yes | Yes | Yes | Yes | Yes. |
| 5 | Yes | Yes | No | No | No | No. |
| 6 | No | Yes | Yes | No | No | Yes. |
| 7 | Yes | No | Yes | Yes | No | No. |
| 8 | No | No | No | Yes | No | No. |

For the purpose of subtraction, the minuend is considered to be the TO word and the subtrahend is considered to be the FROM word. The difference is then recorded in the main storage in the TO word position. Thus, the Change signals will represent the manner in which the FROM word must be changed to correctly portray the difference between the FROM word and the TO word.

The first line of the subtraction chart illustrate the case of T1, $\overline{F1}$, and $\overline{C}$. This operation corresponds to 1–0 with no borrow. The answer is 1, however, the chart shows that no Change F1 signal is produced despite the fact that an F1 bit must be stored. The reason for this is in the sum and recomplement circuit and will be obvious from the explaantion of that portion of the computer.

The Change 1 signal corresponding to lines 4 and 7 of the chart is produced by AND gate 203 which has as its inputs T1, C and Subtract. The output of AND gate 203 is high when these conditions exist and produces a Change 1 signal through OR circuit 205.

AND gate 204 corresponds to lines 3 and 8 of the chart. $\overline{T1}$, $\overline{C}$ and Subtract are the inputs to this gate and when they are high a Change 1 signal is produced through OR circuit 205.

AND gates 214, 215 and 216 develop the signal which indicates the lack of a binary carry $\overline{C2-}$, or borrow, as it is designated for subtraction. T1, $\overline{F1}$ and Subtract are the inputs to AND gate 214. This corresponds to lines 1 and 7 of the chart. When these lines are high a $\overline{C2-}$ signal is produced through OR circuit 217 from AND gate 214.

AND gate 215 is conditioned to produce $\overline{C2-}$ an output through OR circuit 217 when $\overline{F1}$, $\overline{C}$ and Subtract are high. This corresponds to line 7 of the chart.

The $\overline{C2-}$ signal corresponding to line 5 of the chart is produced through OR circuit 217 by AND gate 216. This AND gate is conditioned to produce an output when $\overline{C}$, T1 and Subtract are high.

The existence of a borrow or C2− signal is produced at the output of OR circuit 221 by the output of AND gates 218, 219, or 220. AND gate 218 corresponds to lines 3 and 6 of the chart since it produces a C2− output through OR circuit 221 when $\overline{T1}$, F1 and Subtract are high. Line 4 of the chart is represented by AND gate 219 which provides a C2− signal through OR circuit 221 when F1, C and Subtract are high.

The remaining C2− condition, set forth at line 2, is derived by AND gate 220 which provides a C2− output through OR circuit 221 when $\overline{T1}$, C and Subtract are high.

In the foregoing manner all combinations of carry, FROM bit 1 and to TO bit 1 are combined according to the rules of binary addition or subtraction to produce signals which indicate the presence and absence of carries and borrows. The Binary section adder also develops a Change 1 signal which is later combined with the bit 1 position of the FROM digit in a manner to correctly indicate the sum or difference according to the arithmetic operation performed.

TO CORRECTION ADDER

As mentioned previously, the configuration of a matrix adder may be considerably simplified by making simple logical operations prior to the general combination of the two numbers. The Binary section adder constitutes one of these preliminary logical operations. Another of the preliminary operations is accomplished in the TO Correction adder. It will be seen that the inputs to the TO Correction adder, as shown in FIG. 3, are $\overline{C2+}$, C2+, $\overline{C2-}$ and C2−, from the Binary section adder and, additionally, T2, $\overline{T2}$, T4, $\overline{T4}$, T8 and $\overline{T8}$ from the TO register.

The values from the TO register are combined in AND gates 301, 302, 303, and 304 to present to the remaining logic the decoded value of the TO register in the form 0, 2, 4, 6, or 8. For example, AND gate 301 has as its inputs $\overline{T2}$, $\overline{T4}$ and $\overline{T8}$. This results in an output from AND gate 301 which represents T=0 disregarding the value of the bit 1 position which was combined in the Binary section adder. AND gate 302 has as its inputs $\overline{T4}$ and T2. It can be seen that the output of AND gate 302 will be high when the value in the TO register is T2, once again disregarding the lowest binary order which has been previously considered in the Binary section adder. The output of AND gate 303 will be high when T4 and $\overline{T2}$ exist in the TO register. This represents T4 in the TO register. A T6 in the TO register results from an output at AND gate 304, having as its inputs T2 and T4. A value of T8 in the TO register is directly represented by T8 since no further decoding is required.

The output of the TO Correction adder represents the sum of any carries from the Binary section adder and the digit contained in the TO register. In addition, certain values from the TO register, namely T0 and T8 are carried through the TO Correction adder directly to the Change adder. The other values from the TO Correction adder are designated corrected TO digits. For example, CT2 which is a corrected TO digit of the number 2 results from energization of an output from AND gates 305, 306, 307 or 308 to OR circuit 309. AND gate 305 has as its inputs T2 and $\overline{C2+}$. It can be seen that this combination will result in a CT2 since a 2 exists in the TO register and there is no carry from the Binary section adder.

The inputs to AND gate 306 are T=0 and C2+. This is the opposite situation from that which energizes AND gate 305 since here there is a 0 in the TO register and C2+ from the Binary section adder. AND gate 307 is energized by T6 and $\overline{C2-}$ which is a condition existing during subtraction. Similarly AND gate 308 energized by T8 and C2− is also used during subtraction and will be discussed later.

A corrected TO digit of 4 is produced by the outputs of AND gates 310, 311, 312, or 313 feeding through OR circuit 314. AND gate 310 is energized by T4 and $\overline{C2+}$. AND gate 311 is energized by T2 and C2+. AND gate 312 is energized by T4 and $\overline{C2-}$, a condition which may exist during the subtract operation. AND gate 313 is energized by T6 and C2−, a condition which may also exist during subtraction.

A corrected TO digit of 6 is produced by the outputs of AND gates 315, 316, 317 or 318 feeding through OR circuit 319. AND gate 315 is energized by T6 and $\overline{C2+}$. AND gate 316 is energized by T4 and C2+ which constitutes a 6 when combined. AND gate 317 is energized by T2 and $\overline{C2-}$, a condition which may exist during subtraction. AND gate 318 is energized by T4 and C2−, another condition which may exist during subtraction.

A corrected TO digit of 8 is provided by the outputs of AND gates 320, 321, 322, or 323 feeding through OR circuit 324. AND gate 320 is energized by T8 and $\overline{C2+}$. AND gate 321 is energized by T6 and C2+ which constitute an 8 when added together. AND gate 322 is energized by T0 and $\overline{C2-}$, another condition which may exist during subtraction. AND gate 323 is energized by T2 and C2— which is a condition which may arise during subtraction.

It can be seen that each of the corrected TO digits may be produced by two AND gates during addition and two AND gates during subtraction. If only an addition or subtraction operation were to be provided, the additional circuits required for the operation not desired could be eliminated.

In summary, the TO Correction adder accepts as its inputs the 2, 4, and 8 positions of the TO register and the carries which may have resulted from the addition in the Binary section adder. These numbers are combined and appear as outputs in the form of CT digits. In addition to these corrected digits the 0 bit value and the 8 bit value are carried through from the TO register to the Change adder. The CT digits do not take into account the value of the bit 1 position in the TO register.

FROM CONVERTER

Figure 4:
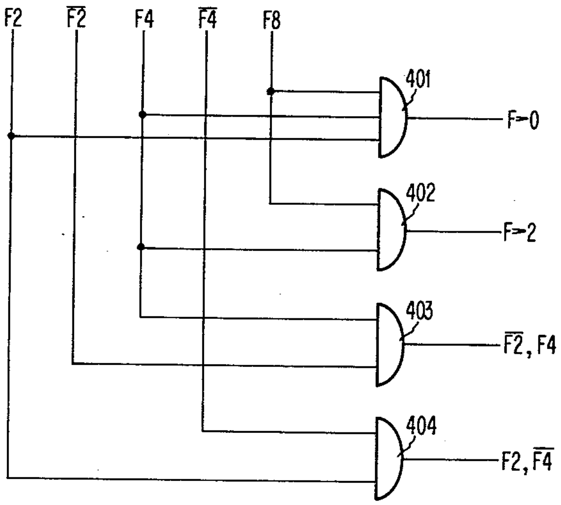
FIG. 4 is a schematic logical drawing of the FROM converter.

Another of the preliminary conversions which permits substantial simplification of a matrix adder is accomplished in the FROM converter as shown in FIG. 4. The FROM converter is energized by the high order bit positions in the FROM register. These constitute F2, $\overline{F2}$, F4, $\overline{F4}$ and F8. By combining F2, F4 and F8 in OR circuit 401, it can be seen that F>0 signal is produced. If any one of F2, F4 or F8 are present, the output of OR circuit 401 will be high indicating that the value of the digit in the FROM register represented in the high order bit positions is greater than 0, exclusive of the value in the bit 1 position.

F4 and F8 are combined in OR circuit 402. If either of these signals are present, the output of OR circuit 402 will be high indicating that the value in the FROM register is greater than 2. The output of or circuit 403, energized by $\overline{F2}$ and F4, is high if there is an $\overline{F2}$ signal or if there is an F4 signal. OR circuit 404 has as its inputs F2 and $\overline{F4}$. If either of these values is present in the FROM register the output of OR circuit 404 will be high indicating F2 or $\overline{F4}$.

Thus, the FROM converter indicates that the value in the high order bit positions of FROM register is greater than 0, from the output of OR circuit 401; the value in the FROM register is greater than 2, by OR circuit 402; that there is no 2 in the FROM register or that there is a 4, by OR circuit 403; and that a 2 exists in the FROM register or no 4, by the output of OR circuit 404.

CHANGE ADDER

Figure 5:
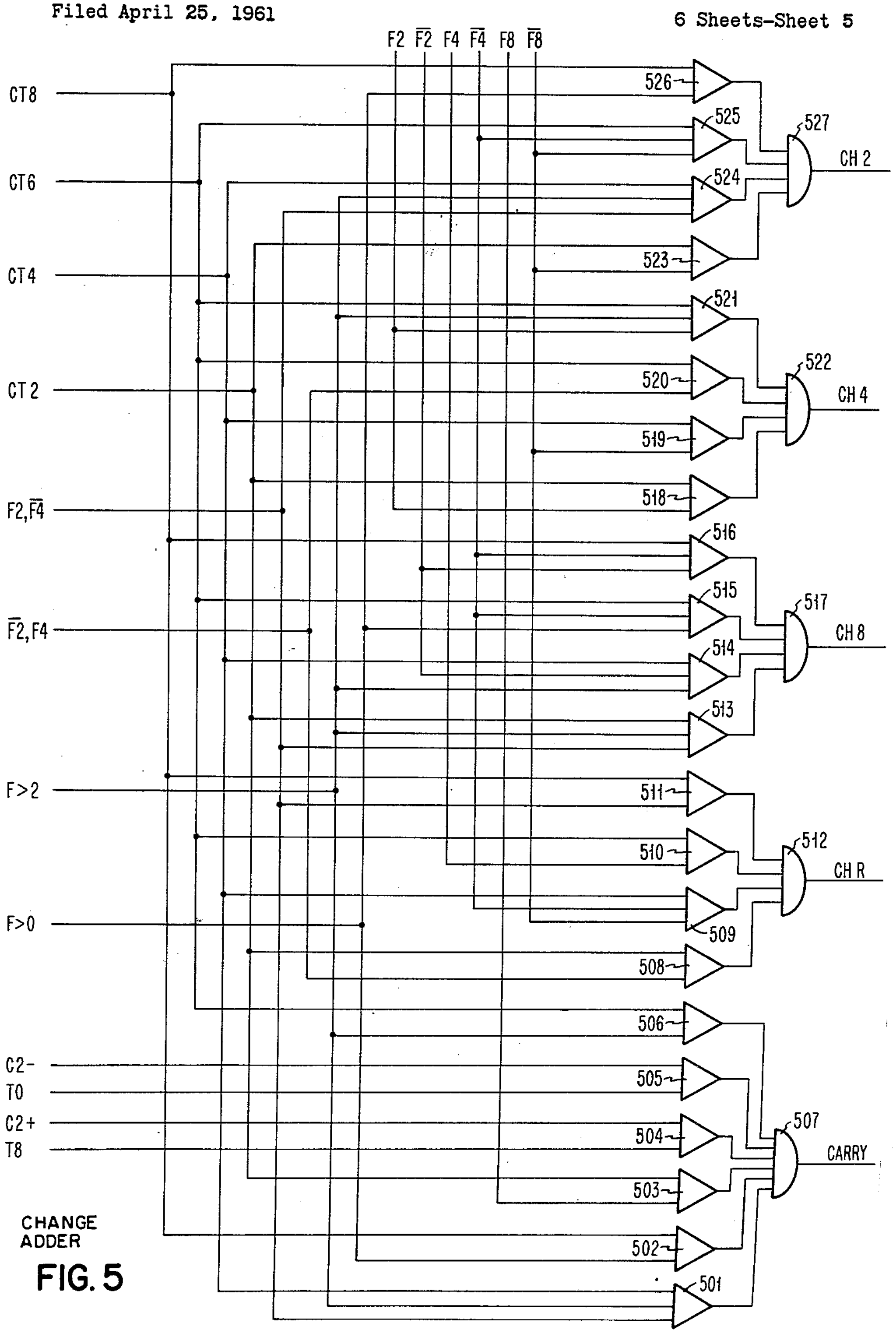
FIG. 5 is a schematic logical drawing of the modified matrix or change adder.

Having made the preliminary conversions to simplify a parallel combination in a matrix adder, the outputs of the FROM converter, the TO Correction adder and the FROM register are combined in the Change adder of FIG. 5. Inputs to the Change adder from the FROM register include F2, $\overline{F2}$, F4, $\overline{F4}$, F8 and $\overline{F8}$. It will be remembered that the F1 and T1 data was combined in the Binary section adder and need not be considered here. Inputs from the FROM converter shown in FIG. 4 include F>0, F>2, $\overline{F2}$,F4 and F2,$\overline{F4}$. The remaining inputs to the Change adder come from the TO Correction adder of FIG. 3. These include T8, T0 and corrected TO digits CT2, CT4, CT6 and CT8. C2+ and C2— from the Binary section adder constitute additional inputs to the Change adder. By making these preliminary conversions and presenting the data in the form disclosed, the matrix or one step adder may be greatly simplified.

AND gates 401 through 506 produce a carry to the next decimal digit through OR circuit 507. For example, AND gate 501 has as its inputs F2, $\overline{F4}$, F>2, and CT4. It can be seen that the minimum value for which an output will be produced at AND gate 501 exists when the high order positions of the FROM register represent a minimum of 6 and the corrected TO digit is 4. This would result in a sum of 10 which produces a carry to the next higher digit.

In the case of AND gate 502, having as its inputs F>0 and CT8, the output will be high when the sum of the corrected TO digit and the high order positions in the FROM register is equal to or greater than 10. F8 and CT2 constitute the inputs to AND gate 503. When both these values are present, the output of AND gate 503 will be high indicating a sum of 10 or greater. T8 and C2+ are the inputs to AND gate 504. When both these inputs are high the output of AND gate 504 is also high indicating the existence of a carry to the next highest digit. AND gate 505 has as its inputs T0 and C2—. This AND gate is used in the subtract operation. AND gate 506 has as its inputs F>2 and CT6. When the number in the high order bit positions in the FROM register is greater than 2 and the corrected TO digit is 6, the minimum value of the sum is 10 which would result in a carry to the next highest digit position. Thus, the outputs of AND gates 501 through 506 are carried to the inputs of OR circuit 507. When any one of the outputs of these AND gates is high, a carry to the next highest digit position is produced by the output of OR circuit 507.

It is essential that the adder operation be capable of checking to permit detection of the errors produced during the add or subtract operation. AND gates 508, 509, 510, and 511 together with OR circuit 512 constitute the means for inserting or removing the redundancy bit or R bit so that odd parity is maintained at all times. The inputs to AND gate 508 are CT2 and $\overline{F2}$,F4. When these two lines are both high it indicates that the redundancy bit in the FROM register must be changed to maintain odd parity since the condition of the redundancy trigger in the FROM register is incorrect relative to the sum. A Change R signal, CHR, may also be produced by the output of AND gate 509 through OR circuit 512. The inputs to AND gate 509 are $\overline{F8}$, $\overline{F4}$ and CT4. AND circuit 510, which can also produce CHR through OR circuit 512, has inputs F4, and CT6. AND gate 511 provides an additional means for producing a CHR through OR circuit 512. This AND gate has inputs F2,$\overline{F4}$, and CT8. It will be understood that the CHR signal and the circuitry necessary to derive it, could be eliminated if it is not desired to maintain a check on the operation of the add circuit. In most cases it will be desirable to incorporate this circuitry to allow detection of errors.

A Change 8 signal, CH8, indicative of the fact that the 8 trigger in the FROM register must be changed to properly represent the sum, is produced by the outputs of AND gates 513, 514, 515 and 516, connected through OR circuit 517. In the case where F2,$\overline{F4}$ and F>2 and CT2 signals are present, the output of AND gate 513 will be high indicating through OR circuit 517 that the condition of the 8 trigger in the FROM register must be changed to represent the sum. In a like manner, the inputs to AND gate 514, F>2, $\overline{F2}$, and CT4 also produce CH8.

F>0, $\overline{F4}$ and CT6 constitute the inputs to AND gate 515. When these three lines are high, the output of AND gate 515 is high and produces CH8 through OR circuit 517.

Further means for deriving CH8 is presented by AND gate 516. Inputs to this AND gate are $\overline{F2}$, $\overline{F4}$ and CT8. When these inputs are high, CH8 is produced through OR circuit 517.

A Change 4 signal, CH4, is produced by the outputs of AND gates 518, 519, 520, or 521 passing through OR circuit 522. F2 and CT2 combine in AND gate 518 to raise the output and produce CH4 through OR circuit 522.

AND gate 519 combines $\overline{F8}$ and CT4 to produce CH4. In the case of AND gate 520, $\overline{F2}$, F4 and CT6 are combined to produce CH4. AND gate 521 is conditioned by F2, F>2 and CT6 to produce CH4 through OR circuit 522.

The Change 2 signal, CH2, is produced by the outputs of AND gates 523, 524, 525, or 526 by passing through OR circuit 527.

In the case of AND gate 523 the output is high to produce CH2 when inputs exist on the $\overline{F8}$ and CT2 lines. AND gate 524 is conditioned to produce CH2 by F2,$\overline{F4}$, F>2, and CT4.

$\overline{F8}$, $\overline{F4}$, and CT6 combine to condition AND gate 525 and produce a CH2 signal through OR circuit 527. The output of AND gate 526 is high when F>0 and CT8 are high to produce CH2 through OR circuit 527.

The carry signal operates to set the Carry trigger to the proper condition at the beginning of the add operation for the next digit. Circuitry not shown resets the Carry trigger toward the end of each digit addition to permit setting of the trigger prior to receiving the next digit.

At this point, a determination has been made as to the existence of a carry to the next digit position and the manner in which the bits in the FROM register 1, 2, 4, 8, and R bit positions must be changed in order to properly represent the sum of the numbers contained in the TO and FROM registers. To derive the sum signal, a comparison of the Change signals provided by the Binary section adder and the Change adder are compared with signals representative of the digits stored in the FROM register. This combination is performed in the sum and recomplement circuit of FIG. 6.

CHANGE ADDER LOGIC

FIG. 7 illustrates in a somewhat different form the manner of operation of the Change adder. Since the operation of the Binary section adder is completely straight forward, no truth table is shown for this portion of the invention. FIG. 7*a* represents a truth table for the changes required to the bit 2 position of the digit in the FROM register. The values of T across the top of the table indicate the value contained in the TO register. This value is exclusive of the condition of the bit 1 position since this is taken care of in the Binary section adder. The values contained in the FROM register are indicated along the left side of the table. An X in the table at the intersection of a TO and FROM value indicates that the value in the FROM register, in this case bit 2 position, must be changed to correctly indicate the sum of the FROM and TO digits. Conversely, the absence of an X at the intersection of two values indicates that no change in the FROM value is required to indicate the sum of the digit.

Figure 7B:
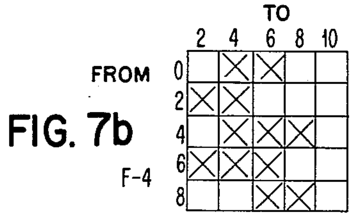

The truth table of FIG. 7*b* indicates the manner in which F4 bit must be changed to indicate the sum of the FROM and TO digits.

Figure 7C:
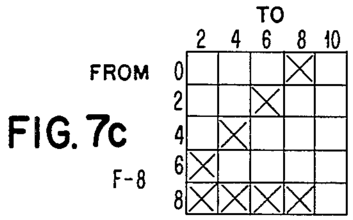
Figure 7D:
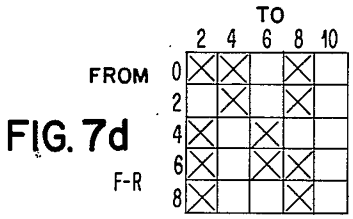
Figure 7E:
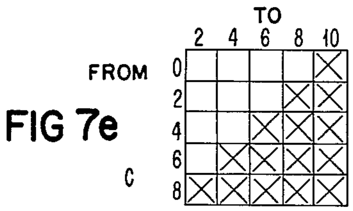

FIG. 7*c* is a truth table for the changes required to the bit 8 position. Changes required to the R bit trigger in the FROM register and the Carry trigger to the next addition cycle are indicated in FIG. 7*d* and FIG. 7*e* respectively.

By way of example, assume a TO digit of 2 is added to a FROM digit of 6. To correctly represent the sum of 6 and 2 the value of the bit 2 position, the bit 4 position and the bit 8 position must be changed in the FROM digit. This changes the value of the FROM digit from 6 to 8. Since the FROM digit was originally represented by F2, F4 and $\overline{F8}$ and must be changed to $\overline{F2}$, $\overline{F4}$, and F8 an X appears at the intersection of the first column with the fourth row in each of the three tables of 7*a*, 7*b* and 7*c*. This indicates that the status of the F2, F4 and F8 bits must be changed to correctly represent the sum.

SUM AND RECOMPLEMENT

In the case of addition, a Change line from the Change adder and Binary section adder indicate those values in the FROM register must be changed to represent the sum. The Change signals are combined with the outputs of the FROM register and the sum and recomplement unit of FIG. 6. The output signals of the sum and recomplement unit, store bit 1, store bit 2, store bit 4, store bit 8, and store bit R, indicate the sum of the digits stored in the FROM and TO registers. The output signals can be used to set another register indicating the sum, or they may be used to store the value of the sum in the main core storage as shown in FIG. 1.

The Exclusive OR circuit, which provides an output if either, but not both of the inputs are high, provides means for combining the Change signal with the values in the FROM register.

For example, the inputs to Exclusive OR circuit 601 are F1 from the FROM register, and CH1 from the Binary section adder. In the True condition, Exclusive OR circuit 601 provides a store bit 1 signal through Exclusive OR circuit 606, when either, but not both F1 or CH1 are high. Thus, if a CH1 signal exists and a bit exists in the lowest binary bit order of the FROM register, no output is produced from Exclusive OR circuit 601. This means that no store bit 1 signal will be produced from Exclusive OR circuit 606 resulting in a change of the value in the 1 bit position of the FROM register. A 1 bit existed in this position which is erased by the combination.

In the case of subtraction, it is necessary to store the complement of the output of Exclusive OR circuit 601. Since the output of Exclusive OR circuit 601 represents the absolute value of the difference between the number in the FROM register and the TO register, it is necessary to complement this to correctly indicate the value of the difference. The Complement line is high during subtraction and energizes one input of Exclusive OR circuit 606 the other input to which is the output of Exclusive OR circuit 601. When the output of Exclusive OR 601 is high, no store bit 1 signal is produced since it is cancelled by the Complement line in Exclusive OR circuit 606.

CH2 and F2 are combined in Exclusive OR circuit 602. The output of this circuit produces a store bit 2 signal when either but not both CH2 or F2 are high. If both exist at the same time or neither exists no store bit 2 signal results.

Exclusive OR circuit 603 is energized by F4 and CH4. When the True line is high CH4 and F4 are combined in Exclusive OR circuit 603 to provide a store bit 4 signal through Exclusive OR circuit 608.

The Complement circuit for the store bit 4 signal is somewhat more complex. It can be seen that AND gate 607 has as inputs the output of Exclusive OR circuit 602 and the Complement line. When both these lines are high, the output of AND gate 607 is high. Assuming the output of Exclusive OR 603 is high and the Complement condition is indicated, no store bit 4 signal will be produced from the Exclusive OR circuit when a store bit 2 signal is present. Thus, in the Complement condition, the store bit 4 signal is produced when either a store bit 2 signal is present or the output of Exclusive OR 603 is high. When both these signals are present or neither is present, no store bit 4 signal will be produced by Exclusive OR circuit 608.

A CH8 signal and the F8 signal are combined in Exclusive OR circuit 604. For the True condition an output from Exclusive OR circuit 604 produces a store bit 8 signal through Exclusive OR circuit 609. In the True condition, one of the inputs to OR circuit 610 will be high, that is, the line indicating the True condition. It is also possible that a store bit 2 signal or an output from Exclusive OR circuit 603 could be high, producing an output from OR circuit 610. When any one of these three is high, the output from Inverter 611 will be low. When this output is low, it opens Exclusive OR circuit 609 to pass the output of Exclusive OR 604, if high, and produce a store bit 8 signal. Conversely, if no store bit 2 signal exists and there is no output from Exclusive OR 603 and the True line is not high, there will be no output from OR circuit 610 and the output of Inverter 611 will be high. Since the output of Inverter of 611 is connected to the input of Exclusive OR circuit 609, a store bit 8 signal will be produced if the output of Exclusive OR 604 is low. In the event that both inputs to the Exclusive OR circuit 609 are high, no store bit 8 signal is produced.

The necessity for maintaining odd parity in the number representing the sum requires that the Change R signal be combined with the Change 1 signal in Exclusive OR circuit 605. The output from Exclusive OR circuit 605 will be high when either a Change R signal or a Change 1 signal exists, and low when neither or both are present. The output of Exclusive OR circuit 605 is combined with FR from the FROM register in Exclusive OR circuit 612. The output of Exclusive OR circuit 612 will be high when FR is high, or when the output of Exclusive OR circuit 605 is high. There will be no output from Exclusive OR circuit 612 when both inputs are high or when both inputs are low.

The output of Exclusive OR 612 is connected to one input of Exclusive OR 613. In the true condition the output of Exclusive OR 613, which indicates a store redundancy bit, will always be high when the output of Exclusive OR circuit 612 is high. This is true, because the True line which energizes one input to OR circuit 614 produces an output to the Inverter 615. When the input to Inverter 615 is high, the output is low thereby opening Exclusive OR circuit 613.

In the Complement condition it is also possible that Exclusive OR circuit 613 will be open since OR circuit 614 has an input from the store bit 2 line and also from the output of Inverter 611. When any one of the three inputs to OR circuit 614 is high, the Exclusive OR circuit 613 will be opened. Conversely, when none of the inputs to OR circuit 614 is high, the output of Inverter 615 will be high and the Exclusive OR circuit 613 will produce a store redundancy bit signal only when the output of the Exclusive OR circuit 612 is low.

SAMPLE ADDITION PROBLEM

To further explain this device, a sample add operation will be described. It will be remembered that the registers are made up of a number of triggers, one for each binary coded decimal bit position, and one or the other outputs of the trigger will be high depending upon the presence or absence of that particular bit in the digit being represented.

Assume for the sample problem that it is desired to add a FROM digit of 7 to a TO digit of 8 with a carry from a preceding add operation as shown below:

| | |
|---|---|
| 7 FROM | F1, F2, F4, $\overline{F8}$, $\overline{FR}$ |
| +9 TO (8+Carry) | $\overline{T1}$, $\overline{T2}$, $\overline{T4}$, T8 |
| — | |
| 6 TO (Sum) | $\overline{T1}$, T2, T4, $\overline{T8}$, TR |

At FROM time of the computer cycle, during read time, the FROM digit is read out of the main core storage and placed in the FROM register 11. The FROM control conditions the sense amplifiers 10 associated with the FROM register 11. Thus, at the end of the read time of FROM time, the F1, F2, and F4 triggers in the FROM register are set to represent the presence of F1, F2, and F4 bits. The FR and F8 triggers are not set and the $\overline{FR}$ and $\overline{F8}$ lines are high. During the write time of the FROM time, the information represented in the FROM register, is regenerated in the main core storage at the same address. During the regeneration of the FROM word the True line in the sum and recomplement circuit is high. At the end of FROM time, the read and write times having been completed, the FROM digit 7 is represented in the FROM register and this number has been regenerated in the main core storage at the same address. The computer then goes into the read portion of TO time. The TO control conditions the sense amplifiers 12 associated with the TO register 13 and the TO digit of 8 is read out of the main core storage and stored in the TO register. At the end of read time for the TO time the T8 bit trigger in the TO register will be set and the T1, T2, T4, and TR bit triggers will be left unchanged.

It is assumed that the preceding add operation resulted in a carry which operated to set the Carry trigger 14 to the carry condition. At the end of read time for the TO time, the following lines are high: F1, F2, F4, $\overline{F8}$, $\overline{T1}$, $\overline{T2}$, $\overline{T4}$, T8 and C. In the Binary section adder, FIG. 2, the inputs F1, $\overline{T1}$ and C will be high along with the add line. The three inputs to AND gate 202 are high since Add and C are high. Thus, an output is produced from AND gate 202 through OR circuit 205 to produce a Change 1 signal.

AND gate 211, which is one of those producing the C2+ signal, has as its input F1, C and Add. It can be seen that all three of these inputs are high, therefore, the output of AND gate 211 is high, producing a C2+ signal through OR circuit 213. These are the only output signals produced from the Binary section adder by the sample problem.

For the sample problem, the T8 and C2+ inputs are high to the TO Correction adder of FIG. 3. This set of input values to the TO Correction adder conditions none of the AND gates contained in this portion of the circuit. Thus, the only high output which are presented from the TO Correction adder is the T8 line. CT2, CT4, CT6, CT8 are not high.

In the FROM converter of FIG. 4 the F2 line is high, the F4 line is high. These are the only inputs which are presented to the FROM converter. The combination results in an F>0 signal through OR circuit 401, and on F>2 signal through OR circuit 402. F4 is also high because the F4 line conditions OR circuit 403 to produce an output. The F2 line conditions OR circuit 404 to produce an output on the F2, $\overline{F4}$ line. The inputs presented to the Change adder, FIG. 5, for the sample problem are therefore F2, F4 and $\overline{F8}$ from the FROM register and F>0, F>2, $\overline{F2}$F4 and F2$\overline{F4}$ from the FROM converter. The T8 input to the TO Correction adder is carried through to the Change adder. A C2+ signal is also presented to the Change adder from the Binary section adder.

Looking first at AND gate 504 it can be seen that the T8 signal and the C2+ signal combine to produce an output from this AND gate through OR circuit 507 to indicate a carry. This signal operates to set the Carry trigger to the carry condition just after the completion of the addition of the digit but prior to entering the next digit into the FROM and TO registers. Control circuitry, not shown, provides means for resetting this trigger in the event of a no-carry condition.

The combination of signals presented to the Change adder results in conditioning only AND gate 504. No other AND gate is conditioned, therefore, no CHR, CH8, CH4, or CH2 signals result. Thus, as a result of the combination of the FROM digit of 7, the TO digit of 8 and a carry, the adder has produced a Change 1 signal and a carry indication.

In the sum and recomplement circuit of FIG. 6, the F4, F2 and F1 inputs are high from the FROM register, and the Change 1 input from the Change adder is high. The add operation also results in the True line being high. This is accomplished by control circuitry not shown.

It can be seen that the F1 and CH1 signals are combined in Exclusive OR circuit 601 to produce no output to Exclusive OR 606. Since the Complement line is not high there is no signal presented to Exclusive OR circuit 606 and no output signal will be produced. Therefore, there is no store bit 1 signal as a result of the combination of FROM 7, TO 8 and Carry. The F2 signal conditions Exclusive OR circuit 602 which produces a store bit 2 signal. The F4 signal conditions Exclusive OR circuit 603 to produce a store bit 4 signal through Exclusive OR circuit 608. Since neither of the inputs to Exclusive OR 604 are high, there will be no output produced from this circuit to Exclusive OR 609. The other input to Exclusive OR circuit 609 comes from the inverted output of OR circuit 610. Since one of the inputs to OR circuit 610, that is, the output of Exclusive OR 603 is high, as well as True and the output of Exclusive OR 602, the output of Inverter 611 is low and therefore no output is produced from Exclusive OR circuit 609 resulting in no store bit 8 signal.

Exclusive OR circuit 605 is energized by the Change 1 line and the Change R line. Since a Change 1 line is high, there will be an output produced from Exclusive OR circuit 605 to Exclusive OR circuit 612. The other input to Exclusive OR 612 is FR line from the FROM register and this line is not high therefore an output will be produced from Exclusive OR circuit 612. Since the other input to Exclusive OR circuit 613 is low, an output will be produced indicating that there is a store bit R signal.

Thus, output signals exist on the store bit 2 line, the store bit 4 line and the store bit R line. This indicates a sum of 6. Since the carry has previously been developed, and stored in the carry trigger 14, the correct sum of 16 is therefore indicated. The signals on the output lines from the sum and recomplement circuit may be used to develop the sum in the main core storage or they may be used to set a register not shown.

In normal operation of the computer, the presence of the store bits 2, 4 and R signals would result in storage of these values in the main core memory during write time of the TO cycle. This would result in the correct sum of the FROM and TO digits replacing the value of the TO digit at that location.

SUBTRACTION

Subtraction is performed by complement addition and the assignment of factors is as follows:

```
 6 Minuend (TO word)
—2 Subtrahend (FROM word)
——
 4 Difference (TO word)
```

In performing the subtract operation the TO word is first converted to the 10's complement making the problem appear as follows:

```
 4 TO word, complemented
+2 FROM word
——
 6 Result
 4 Recomplemented result
```

Operation of the Binary section adder is essentially the same for subtraction as it is for addition, however, the absence of a bit 1 in the TO register is taken to be the same as the presence of a bit 1 during addition. This effectively complements the bit 1 position of the TO digit as shown above. Putting it another way, the Change 1 signal developed in the Binary section adder follows the same basic logic as in the add operation. However, T1 and $\overline{T1}$ are interchanged because the TO word must be complemented.

AND gate 203 is energized by T1, C and Subtract and develops a Change 1 signal through OR circuit 205. It can be seen that this is the opposite of the condition which produces a Change 1 signal in the add operation. A comparison of AND gate 202 and AND gate 203 shows that the former is energized by $\overline{T1}$ and C and the latter is energized by T1 and C. Similarly, AND gate 204 is energized by $\overline{T1}$, $\overline{C}$ and Subtract. When these three lines are high an output is produced from AND gate 204 through OR circuit 205 to produce a Change 1 signal.

The $\overline{C2-}$ signal is produced by AND gates 214, 215 and 216 which have their outputs connected to OR circuit 217. An output is produced from AND gate 214 when T1, $\overline{F1}$ and Subtract are high. AND gate 215 is conditioned to pass a signal when $\overline{F1}$, $\overline{C}$ and Subtract are high. The third AND gate 216 is conditioned by T1, $\overline{C}$ and Subtract.

A C2— signal is produced by the outputs of AND gates 218, 219 or 220 through OR circuit 221. AND gate 218 is energized by $\overline{T1}$, F1, and Subtract. AND gate 219 is energized by F1, C and Subtract. The AND gate 220 is energized by C, $\overline{T1}$, and Subtract.

It is obvious that $\overline{C2+}$ and C2+ signals can never be produced during subtract because the AND gates which produce these signals are conditioned only by the add control line.

In the foregoing manner, the Binary section adder accomplishes subtraction of the bit 1 positions of the number contained in the TO and FROM registers. The $\overline{C2-}$ and C2— signals therefore represent the binary carry from addition of the complement of the bit 1 position of the TO digit and the bit 1 position of the FROM digit.

As was the case of the Binary section adder, the TO Correction adder of FIG. 3 operates in a manner similar to the add operation when subtraction is performed. In subtraction, the TO Correction adder accommodates the binary carry C2— or $\overline{C2-}$ and combines this with the higher order values of the TO digit to produce the complement of the sum of the TO digit and C2— or $\overline{C2-}$.

The CT2 signal produced at the output of the OR circuit 309 is developed by AND gates 307 and 308 during subtract. AND gate 307 is energized by T6 and $\overline{C2-}$ while AND gate 308 is energized by T8 and C2—. When a comparison is made of the signals energizing AND gates 305 and 306 on the one hand, and AND gates 307 and 308 on the other, it can be seen that the former produce a CT2 signal for addition, and the latter produce the CT2 signal for subtraction, the one being the complement of the other.

The CT4 signal during subtraction is produced at the output of OR circuit 314 by AND gates 312 and 313. AND gate 312 is conditioned by T4 and $\overline{C2-}$ while AND gate 313 is conditioned by T6 and C2—. CT6 is produced at the output of OR circuit 319 by AND gates 317 and 318. AND gate 317 is conditioned to pass a signal by T2 and $\overline{C2-}$, while AND gate 318 is conditioned by T4 and C2—. The CT8 signal is produced at the output of OR circuit 324 by AND gate 322 and 323. T0 and $\overline{C2-}$ are the inputs to AND gate 322 and T2 and C2— are the inputs to AND gate 323.

The remainder of the units function in the same manner for subtraction as they do for the addition operation with the exception of the sum and recomplement circuit. During the subtract operation, the Complement line is high instead of the True line. This effects a recomplementing of the output of the Change adder to produce the correct difference on the store bit 1, store bit 2, store bit 4, store bit 8 and store bit R lines.

SAMPLE SUBTRACTION PROBLEM

As mentioned previously, this computer accomplishes subtraction by means of Complement addition. In other words, the minuend represented by the TO word is converted into the complement of the actual value and is added to the value of the subtrahend as represented in the FROM word. The sum of the complemented minuend and subtrahend is the complement of the difference between the actual value of the TO word and the FROM word. In order to correctly represent the difference between the subtrahend and the minuend, the result must be recomplemented.

The sample problem illustrates operation of the sum and recomplement circuit for conditions where the subtrahend is greater than the minuend.

Assume a TO digit of 8 as the minuend and a FROM digit of 7 as the subtrahend. This corresponds to the same digit values as were selected for the illustration of the add operation. However, it will be remembered that in this case it is desired to subtract 7 from 8 as shown below.

8 Minuend (TO word) $\overline{T1}$, $\overline{T2}$, $\overline{T4}$, T8, $\overline{TR}$ 7 Subtrahend (FROM word) F1, F2, F4, $\overline{F8}$, $\overline{FR}$ $\overline{1}$ Difference (TO word) T1, $\overline{T2}$, $\overline{T4}$, $\overline{T8}$, $\overline{TR}$ Reading out the FROM digit from the main core storage and storing it in the FROM register is accomplished in the same manner as was the case with addition. The FROM word is then regenerated during write time into the main core storage. Similarly, the TO digit is read out of storage and placed in the TO register. At the conclusion of read time during FROM time, the TO register presents an output signal on the T8 line and the $\overline{T1}$, $\overline{T2}$, $\overline{T4}$ and $\overline{TR}$ lines. The FROM register presents outputs on F1, F2, F4, $\overline{F8}$ and $\overline{FR}$. There is no output from the Carry trigger. In other words the $\overline{C}$ line is high.

Looking first to the Binary section adder, the output of AND gate 204, having as its inputs Subtract, $\overline{T1}$ and $\overline{C}$ is high to produce a Change 1 signal through OR circuit 205. Since $\overline{C2+}$ and C2+ signals are produced only during addition, the AND gates having these inputs may be disregarded. None of the AND circuits which are effective to generate a $\overline{C2-}$ signal is conditioned, therefore this signal is not produced. The output of AND circuit 218, having as its inputs $\overline{T1}$, F1 and Subtract is high to produce a C2— signal through OR circuit 221. Thus, the output of the Binary section adder is represented by a Change 1 signal and a C2— signal.

In the TO Correction adder of FIG. 3, it can be seen that the $\overline{T2}$, $\overline{T4}$, and T8 lines are high and the C2— line coming from the Binary section adder is also high.

The output of AND gate 303 energized from T8 and C2— is high and passes through OR circuit 309 to indicate a CT2 signal. No other AND gates in the TO Correction adder are conditioned, therefore, there is no CT4, CT6 or CT8 signal. The output of the TO Correction adder is represented by a T8 signal and a CT2 signal to the Change adder of FIG. 5.

The FROM converter has the same outputs as was the case for the sample of addition. Since F2, F4, and $\overline{F8}$ are energized, all of the OR circuits 401, 402, 403, and 404 are conditioned to pass a signal and the output appears indicating F>0, F>2, $\overline{F2}$ or F4, and F2 or $\overline{F4}$ lines are high. These signals are connected to the Change adder of FIG. 5.

The inputs to the Change adder of FIG. 5 from the FROM register are F2, F4, and $\overline{F8}$. It will be observed that the original TO digit, which was 8, has now been changed to a 2, which is the complement of 8. This is represented by the CT2 signal presented from the TO Correction added to the Change adder. In the case of the add operation described previously, it will be remembered that the CT2, CT4, CT6, and CT8 signals were not present. This was due to the fact that a carry was introduced from a previous addition. If this carry had not existed, the CT8 signal would have been produced which represents the true value and not the complement as is the case in subtraction. C2— is also presented as an input to the Change adder from the Binary section adder.

None of the AND circuits 501, 502, 503, 504, 505, or 506 is conditioned. Therefore, no Carry signal is produced at the output of OR circuit 507.

The output of AND gate 508, energized by $\overline{F2}$, F4 and CTR2, is high to produce the CHR signal at the output of OR circuit 512.

AND gate 513, which has its inputs energized by F2, $\overline{F4}$, F>2 and CT2 is conditioned to produce an output through OR circuit 517, to develop a CH8 signal.

AND gate 518, which is energized from F2 and CT2, is conditioned to produce an output to OR circuit 522. The output of OR circuit 522 produces a CH4 signal.

AND gate 523 is energized by $\overline{F8}$ and CT2 to produce an output to OR circuit 527. The output of OR circuit 527 produces a CH2 signal.

Thus, the inputs to the sum and recomplement circuit of FIG. 6 from the Change adder are CHR, CH8, CH4, CH2 and CH1. The inputs to the sum and recomplement circuit from the FROM register are F1, F2, and F4. F1 and CH1 are combined in Exclusive OR circuit 601 and the output is low. Exclusive OR circuit 606 is energized from the output of Exclusive OR 601, which is low, and the Complement line. Since the Complement line is high, a store bit 1 signal is produced.

The CH2 signal and F2 signal are combined in Exclusive OR circuit 602 and the output is low. Therefore no store bit 2 signal is produced. The CH4 signal and the F4 signal combine in Exclusive OR circuit 603 to produce no store bit 4 signal from this circuit. Therefore, no output is produced from Exclusive OR circuit 608 because both inputs are low. One input to Exclusive OR 608 comes from Exclusive OR 603 which has a low output, and the other coming from AND gate 607 which has a low input from Exclusive OR 602.

The CH8 signal energizes Exclusive OR circuit 604 to produce an output since the F8 signal is not present. The output of Exclusive OR circuit 604 is applied to Exclusive OR circuit 609. The other input to Exclusive OR circuit 609 comes from Inverter 611. Since all the inputs to the Inverter 11 are down, the output of the Inverter will be high. Since Exclusive OR 609 is energized with two high inputs, no output will be produced and the store bit 8 signal will not be produced.

The CHR signal applied to Exclusive OR circuit 605 along with the CH1 signal, will produce no output from this circuit to the input of Exclusive OR circuit 612. The other input to Exclusive OR circuit 612 comes from FR which is not high in the problem selected. Since neither input to the Exclusive OR circuit 612 is high, no output will be produced to the input of Exclusive OR circuit 613. The other input to Exclusive OR circuit 613 comes from Inverter 615. The input to Inverter 615 is derived from OR circuit 614. Since the output of Inverter 611 is high, a signal will be produced through OR circuit 614 to the input of Inverter 615. The Inverter 615 output will then be low. Since both the inputs to Exclusive OR circuit 613 are low, no store bit R signal will be produced. It will be remembered that the Complement line was stated to be high and the True line was low.

The result of the sample subtraction problem is a T1, $\overline{T2}$, $\overline{T4}$, $\overline{T8}$ and $\overline{TR}$ stored in the former storage positions of the TO digit.

While the invention has been particularly shown and described with reference to a preferred embodiment thereof, it will be understood by those skilled in the are that various changes in form and details may be made therein without departing from the spirit and scope of the invention.

What is claimed is:

1. In a binary coded decimal adder, means for developing the sum of first and second even numbers comprising, a first register, means for entering a digit of said first number into said first register, a second register, means for entering a digit of said second number into said second register, matrix means connected to said registers for developing Change signals indicative of those orders of said first number digit which must be changed to represent the sum of corresponding digits of said first and second numbers, and means connected to said matrix means and to said first register for combining said Change signals with the corresponding orders of said second digits whereby the contents in said first register is changed to produce a sum signal for each of said orders.

2. Adder means for developing the stored sum of first and second even numbers comprising, storage means, a first register, means for reading a digit of said first number from said storage means into said first register, a second register, means for reading a corresponding digit of said second number from said storage means into said second register, matrix adder means connected to said registers for developing Change signals indicative of those orders of said first number digit which must be changed to represent the sum of corresponding digits of said first and second numbers, and means connected to said matrix adder means and said first register for controlling the generation of said sum in storage.

3. Adder means for developing the stored sum of first and second numbers comprising, storage means, a first register, means for reading a digit of said first number from said storage means into said first register, a second register, means for reading a corresponding digit of said second number from said storage means into said second register, means for storing a carry indication from a previous arithmetic operation, binary adder means connected to the lowest order of said first and second registers and said carry indicator for deriving a Change bit 1 signal and carry indication, matrix adder means connected to the remaining orders of said registers and said binary adder means for developing Change signals indicative of those of the remaining orders of said first number which must be changed to represent the sum of said first and second numbers, and a carry signal, and means connected to said matrix adder and said first register for combining the Change signals with the value of the corresponding orders of said first register to produce signals indicative of the sum and carry of said first and second numbers.

4. In a binary coded decimal adder, first means for representing a first digit in binary coded decimal form, second means for representing a second digit in binary coded decimal form, carry representation means, means for entering therein a carry from a previous operation, binary adder means connected to said carry representation means and to the bit 1 position of said first and second representation means for deriving a Change bit 1 and carry signal from the bit 1 position, matrix adder means connected to said first and second representation means and said binary adder for combining the higher orders of said digits with said carry signal to produce Change signals for the higher orders of said digits, and means connected to said matrix means and said first representation means for combining said Change signals with the values of said first digit whereby the contents of said first register is changed to provide sum and carry signals for the higher orders of said digits.

5. In a binary coded decimal adder, first register means for representing a first decimal digit in binary coded decimal form, second register means for representing a second decimal digit in binary coded decimal form, third register means for representing a carry from a previous arithmetic operation, means for developing Change signals indicative of those values in the first register which must be changed to indicate the sum of the carry and the first and second decimal digits comprising, binary adder means, means connecting said binary adder to said first, second and third register means to combine the carry and bit 1 positions to produce a binary carry and a Change signal indicating the manner in which the bit 1 position of the first decimal digit must be changed to indicate the sum, correction adder means, means connecting said correction adder to said binary adder and said second register to produce signals representing the sum of the binary carry and the remaining positions of said second register, matrix adder means, means connecting said matrix adder to said correction adder and the remaining positions of said first register means to produce Change signals indicating the manner in which the remaining positions of the first decimal digit must be changed to represent the sum of the high order positions in said first and second registers and the binary carry from said binary adder means.

6. In a binary coded decimal adder, first register means for representing a first decimal digit in binary coded decimal form, second register means for representing a second decimal digit in binary coded decimal form, third register means for representing a carry from a previous arithmetic operation, means for developing Change signals indicative of those values in the first register which must be changed to indicate the sum of the carry and the first and second decimal digits comprising, binary adder means, means connecting said binary adder to said first, second and third register means to combine the carry and bit 1 positions to produce a binary carry and a Change signal indicating the manner in which the bit 1 position of the first decimal digit must be changed to indicate the sum, correction adder means, means connecting said correction adder to said binary adder and said second register to produce signals representing the sum of the binary carry and the remaining positions, of said second register, matrix adder means, means connecting said matrix adder to said correction adder and the remaining positions of said first register means to produce Change signals indicating the manner in which the remaining positions of the first decimal digit must be changed to represent the sum of the high order positions in said first and second registers and the binary carry from said binary adder means, and means for combining said Change signals with the values of said first digit to provide a sum signal.

7. In a binary coded decimal adder, first register means having bit 1, 2, 4 and 8 positions for representing a first decimal digit in binary coded decimal form, second register means having bit 1, 2, 4 and 8 positions for representing a second decimal digit in binary coded decimal form, third register means having a bit 1 position for representing a carry from a previous arithmetic operation, means for developing Change signals indicative of those values in the first register which must be changed to indicate the sum of the carry and the first and second decimal digits comprising, binary adder means, means connecting said binary adder to the bit 1 positions of said first, second and third register means to produce a binary carry and a Change bit 1 signal indicating the manner in which the bit 1 position of the first decimal digit must be changed to indicate the sum, correction adder means, means connecting said correction adder to said binary adder and said second register to produce signals representing the sum of the binary carry and the bit 2, 4 and 8 positions of said second register, matrix adder means, means connecting said matrix adder to said correction adder and the bit 2, 4 and 8 positions of said first register means to produce Change signals indicating the manner in which the bit 2, 4 and 8 positions of the first decimal digit must be changed to represent the sum of the bit 2, 4 and 8 positions in said first and second registers and the binary carry from said binary adder means.

8. In a binary coded decimal adder, first register means having bit 1, 2, 4 and 8 positions for representing a first decimal digit in binary coded decimal form, second register means having bit 1, 2 4 and 8 positions for representing a second decimal digit in binary coded decimal form, third register means having a bit 1 position for representing a carry from a previous arithmetic operation, means for developing Change signals indicative of those values in the first register which must be changed to indicate the sum of the carry and the first and second decimal digits comprising, binary adder means, means connecting said binary adder to the bit 1 positions of said first, second and third register means to produce a binary carry and a Change bit 1 signal indicating the manner in which the bit 1 position of the first decimal digit must be changed to indicate the sum, correction adder means, means connecting said correction adder to said binary adder and said second register to produce signals representing the sum of the binary carry and the bit 2, 4 and 8 positions of said second register, matrix adder means, means connecting said matrix adder to said correction adder and the bit 2, 4 and 8 positions of said first register means to produce change signals indicating the manner in which the bit 2, 4 and 8 positions of the first decimal digit must be changed to represent the sum of the bit 2, 4 and 8 positions in said first and second registers and the binary carry from said binary adder means, and means for combining said Change signals with the values of said first digit to provide a sum signal.

9. In a decimal adder for binary coded decimal numbers, first register means having bit 1, 2, 4 and 8 positions for representing a first digit, second register means having bit 1, 2, 4 and 8 positions for representing a second digit, third register means having a bit 1 position for representing a decimal carry from a previous arithmetic operation, a first set of logical circuits connected to said first, second and third register means for producing a signal indicating a binary carry and a change signal indicating the manner in which the bit 1 position of the first digit must be changed to represent the sum of said carry and said first and second set of logical circuits connected to said first set of logical circuits and said second register means for combining the binary carry and the value in the bit 2, 4 and 8 positions of said second register to produce signals indicating the value in said second register corrected for said binary carry, and a third set of logical circuits connected to said first register and said first and second logical circuits for producing Change signals which indicate a decimal carry and the manner in which the bit 2, 4 and 8 values in said first register must be changed to represent the sum of said first and second digits.

10. In a decimal adder for binary coded decimal numbers, first register means having bit 1, 2, 4 and 8 positions for representing a first digit, second register means having bit 1, 2, 4 and 8 positions for representing a second digit, third register means having a bit 1 position for representing a decimal carry from a previous arithmetic operation, a first set of logical circuits connected to said first, second and third register means for producing a signal indicating a binary carry and a Change signal indicating the manner in which the bit 1 position of the first digit must be changed to represent the sum of said carry and said first and second digits, a second set of logical circuits connected to said first set of logical circuits and said second register means for combining the binary carry and the value in the bit 2, 4 and 8 positions of said second register to produce signals indicating the value in said second register corrected for said binary carry, a third set of logical circuits connected to said first register and said first and second logical circuits for producing Change signals which indicate a decimal carry and the manner in which the bit 2, 4 and 8 values in said first register must be changed to represent the sum of said first and second digits, and means for combining said Change signals with the values in said second register to produce signals indicating the sum of said decimal carry and said first and second decimal digits.

References Cited in the file of this patent

UNITED STATES PATENTS 2,938,668 Havens et al. ------------ May 31, 1960

UNITED STATES PATENT OFFICE

CERTIFICATE OF CORRECTION

Patent No. 3,154,676 October 27, 1964

Leonard Roy Harper

It is hereby certified that error appears in the above numbered patent requiring correction and that the said Letters Patent should read as corrected below.

Column 21, lines 25 and 26, after "second" insert -- digits, a second --.

Signed and sealed this 16th day of March 1965.

(SEAL)
Attest:

ERNEST W. SWIDER
Attesting Officer

EDWARD J. BRENNER
Commissioner of Patents